United States Patent
Hogevik

[11] Patent Number: 6,070,091
[45] Date of Patent: May 30, 2000

[54] METHOD FOR DETECTING PERFORMANCE DEGRADATION IN RADIO BASE STATIONS DUE TO INTERMODULATION PRODUCTS

[75] Inventor: Osborn Wilhelm Hogevik, Täby, Sweden

[73] Assignee: Telefonaktiebolaget LM Ericsson, Stockholm, Sweden

[21] Appl. No.: 08/979,610

[22] Filed: Nov. 28, 1997

[51] Int. Cl.⁷ .................................................. H04B 1/38
[52] U.S. Cl. ................ 455/561; 455/296; 455/310; 455/424
[58] Field of Search .................. 455/73, 62, 63, 455/67.1, 67.2, 67.3, 423, 424, 425, 226.2, 561, 310; 375/228

[56] References Cited

U.S. PATENT DOCUMENTS

| | | | |
|---|---|---|---|
| 4,352,182 | 9/1982 | Billi et al. | 375/228 |
| 4,837,801 | 6/1989 | Shimura | 455/561 |
| 5,001,776 | 3/1991 | Clark | 455/226.2 |
| 5,321,847 | 6/1994 | Johnson, Jr. | 455/63 |
| 5,471,649 | 11/1995 | Rees et al. | 455/67.4 |
| 5,551,064 | 8/1996 | Nobbe et al. | 455/62 |
| 5,697,081 | 12/1997 | Lyall, Jr. et al. | 455/249.1 |
| 5,701,590 | 12/1997 | Fujinami | 455/62 |
| 5,768,689 | 6/1998 | Borg | 455/67.4 |
| 5,778,322 | 7/1998 | Rydbeck | 455/558 |
| 5,781,845 | 7/1998 | Dybdal et al. | 455/65 |
| 5,918,167 | 6/1999 | Tiller et al. | 455/310 |

FOREIGN PATENT DOCUMENTS

| | | |
|---|---|---|
| 195 16 063 | 5/1998 | Germany . |
| WO97/39597 | 10/1997 | WIPO . |

OTHER PUBLICATIONS

European Standard Search Report re RS 100761 Date of completion of search: May 28, 1998.

*Primary Examiner*—Dwayne D. Bost
*Assistant Examiner*—Charles R Craver
*Attorney, Agent, or Firm*—Burns, Doane, Swecker & Mathis, L.L.P.

[57] ABSTRACT

A method of detecting the degradation of a transceiver performance due to intermodulation products in radio base stations is disclosed. In an embodiment of the invention, the method includes measuring the received signal strength for each individual receiver frequency and recording the operational state of all transmitters. A plurality of data samples are used to determine a correlation between the received frequencies and associated disturbance. The degradation of signal reception caused by intermodulation (IM) products is derived from the correlated samples. If the performance is found to be below a predetermined value, a notification is initiated upon which corrective action can be taken. The method provides for prompt indication of poorly performing transceivers due to interference from IM products.

12 Claims, 2 Drawing Sheets

METHOD FOR DETECTING PERFORMANCE DEGRADATION IN RADIO BASE STATIONS DUE TO INTERMODULATION PRODUCTS

FIELD OF THE INVENTION

The present invention relates generally to intermodulation products affecting radio base station performance. More specifically, the invention relates to a method of detecting undesirable intermodulation products that degrade transceiver performance in signal reception.

BACKGROUND OF THE INVENTION

The performance of radio base station in wireless telecommunication systems may be affected by a number of factors. Specifically, the operational performance of transceivers in radio base stations is of particular importance to service providers because it has a direct effect on the quality of service and experience of the end user. A notable problem that has been well known to plague base station performance is the undesirable generation of intermodulation (IM) products that interfere with the operation of transceivers. Typically complications arising from interference are, in part, induced by connectors, antennas, and other non-linear elements in base stations. The difficulties occur when these intrinsic IM products happen to coincide with the receiver frequencies thus interfering with signal reception. The problem may be exacerbated by the aging of components such as combiners, couplers and duplex filters which operate in association with transceiver elements.

FIG. 1 shows a typical multi-carrier transceiver arrangement together with associated functional components within a radio base station. In this arrangement, the output from a plurality of transmitters i.e. Tx1, Tx2, Tx3, and Tx4 are collected by utilizing a combiner 12. Combiner 12 enables signals from the multiple transmitters to be combined into a single output signal which is then routed to a duplex filter 14. The output signal then emerges from the duplex filter for transmission through antenna 16. It is desirable to use a common antenna for the transmission of output signals and for the reception of incoming signals for efficient operation. The duplex filter 14 permits the use of the common antenna by separating the transmitted signals from the incoming signals. The incoming signals are then routed to a multi-coupler 18 which permits the signals, in accordance with the associated frequency, to be routed to the appropriate receivers Rx1, Rx2, Rx3, or Rx4.

Since the functional components are interconnected, interference generated in any part of the system can affect other elements. For example, IM products accumulated in antenna 16, that fall within the receive frequencies, are routed back to the receivers as shown by path 20. The effects of IM products may be induced by a number of factors, such as the aging of components, bad connections etc. As known by those skilled in the art, IM products which fall within the receiving frequency range may severely interfere with reception of legitimate incoming signals. Additionally, as shown by path 22, interference caused by transmitter operation may be reflected into the receiver path 20 caused by an impedance mismatch with the duplex filter 14 thereby disturbing the receivers. The effect of the disturbance results in a lower signal level thereby degrading receiver performance.

When the bandwith of the IM product is known, it is possible to calculate and preconfigure the receive frequencies such that they will be minimally impacted. For example, a known bandwith of the IM product is approximately equal to the bandwith of the generation signals multiplied by the order of the IM. Thus frequencies can be determined which avoid the interference. Although, this frequency planning approach may work in static situations, it is unsatisfactory for use with systems employing dynamic frequency techniques such as adaptive channel allocation (ACA). Moreover, depending on the particular IM interference, frequency planning places unnecessary restrictions on which frequencies may be used which may not be the most convenient part of the spectrum. ACA techniques, when devoid of effects from IM issues, permit spontaneous frequency hopping to less congested areas of the frequency spectrum for more efficient operation.

As the equipment ages and IM products increasingly become problematic with time. Furthermore, it is difficult to detect precisely when the interference becomes sufficiently high as to degrade base station performance. In view of the foregoing, it is an objective of the present invention to provide a relatively accurate method for detecting when such problematic intermodulation conditions occur.

SUMMARY OF THE INVENTION

Briefly described, and in accordance with an embodiment thereof, the invention discloses a method of detecting the degradation of transceiver performance due to intermodulation (IM) products in radio base stations. In an embodiment of the present invention, the method includes measuring the received signal strength for each individual receiver frequency. The associated state of operation of all transmitters at the time of measurement is recorded together with each signal strength measurement. A plurality of data samples are taken to determine the correlation between the transmitter frequencies and associated disturbance. A determination of transceiver performance affected by intermodulation products is derived from the correlated samples. If the performance is determined to be below a predetermined value, a notification is initiated upon which corrective action can be taken.

The present invention discloses a method of detecting base station performance degradation caused by transmitter interference and IM products generated in the transceiver system and associated components. The method permits the prompt notification of poorly performing transceivers due to interference from IM products. It thus becomes possible to determine if the origin of the performance degradation is due to intermodulation problems.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

Figure 1:
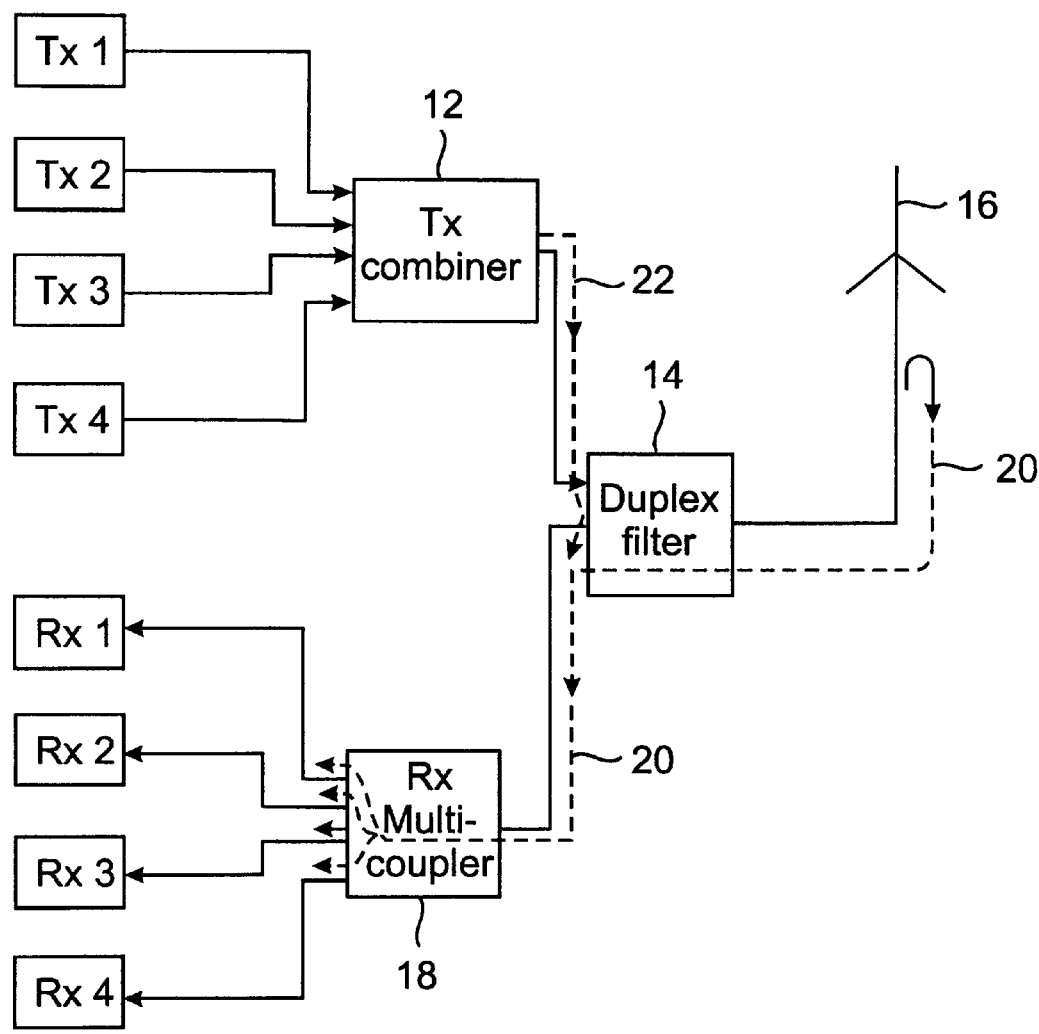
FIG. 1 shows a typical multi-carrier transceiver arrangement together with associated functional components within a radio base station.

A discussion of FIG. 1 directed toward the intermodulation problems associated with a multi-carrier transceiver arrangement for a typical radio base station was provided in the preceding sections. In accordance with an exemplary embodiment of the present invention, a method of detecting intermodulation (IM) products that result in performance degradation of transceiver circuits is disclosed herein. The method employs a statistical correlation technique derived from a sampling of a sufficiently large number of received signal strength parameters in conjunction with known information on transmitter operation.

Figure 2:
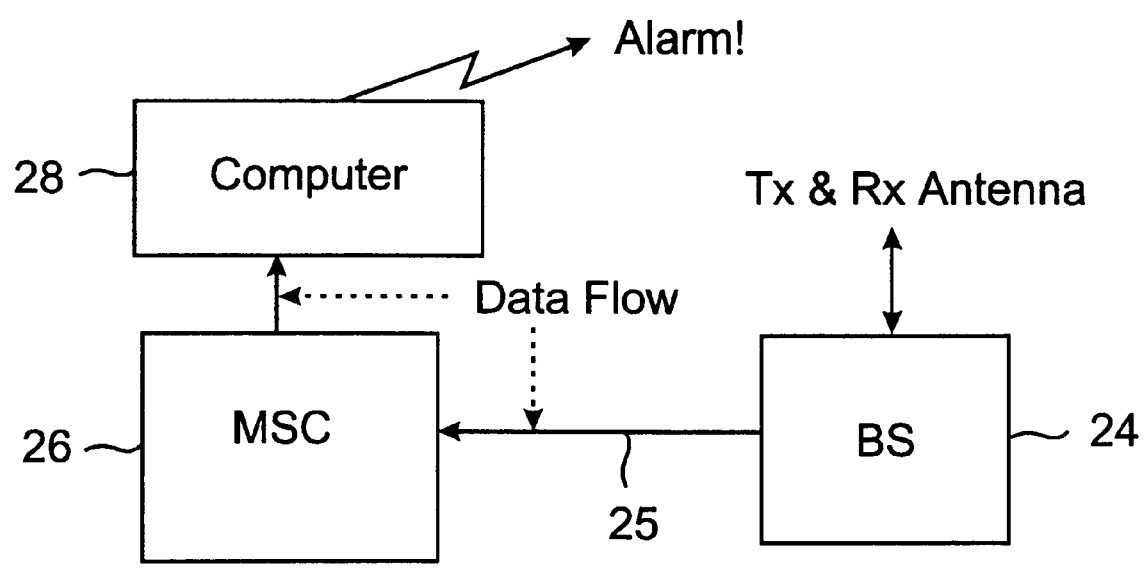
FIG. 2 shows a functional block diagram of a detection system in accordance with an embodiment of the invention.

FIG. 2 depicts a functional block diagram of a detection system and related components as implemented in accordance with the embodiment. A base station (BS) 24 comprises a transceiver arrangement as shown in FIG. 1. In the BS 24, data is sampled periodically in order to determine if IM products are at unsatisfactory levels and may be interfering with transceiver performance. By way of example, the data includes whether a particular combination of transmitter are transmitting on associated (Tx) frequencies together with a incoming receive signal strength measurement for a particular receiver operating at a specific receiving frequency (Rx). In other words, received signal strengths on all idle receiver (Rx) frequencies are monitored to determine whether they may be affected by specific combinations of operating transmitters. The number of data samples may be varied to yield more accurate results i.e. by decreasing the sample period, for example. In the preferred embodiment, it has been found that by sampling second or twice every second yields adequate results. By knowing precisely which Tx's are transmitting and its effect on the received signal strength, it is possible to dynamically determine when internally generated IM products interfere with the proper reception of incoming signals.

Once the data is sampled at the BS 24, it is sent to an mobile switching center (MSC) 26 via a high speed digital link 25. Typically, communication with the MSC occurs by way of a pulse code modulation (PCM) link capable of efficiently delivering digital data over vast distances in accordance with a specified standard such as T1 or E1. The data is then sent to a computer 28 connected to MSC 26 where it is stored and analyzed. Since the sampled data includes the received signal strength at a particular receiver e.g. Rx1 and the present operational state of each of the transmitters at the time of sampling, a correlation can be determined between the parameters. The received signal strength may, for example, be graded on a scale of zero to ten, where ten represents the highest received signal strength and zero represents none at all. Table A below shows an example of the average received signal strengths of one thousand samples for Rx1 and the various combinations of transmitter states.

TABLE A

| Rx1 (Ave Sig.Strength) | Tx2 (on) | Tx3 (on) | Tx4 (on) |
| --- | --- | --- | --- |
| 1 | Yes | Yes | No |
| 10 | No | Yes | Yes |
| 2 | Yes | No | Yes |

Similar data is collected for the remaining receivers Rx2, Rx3, and Rx4. It should be noted that the table can be reduced to cover only cases where IM products may occur. The received signal level corresponding to unsatisfactory performance may be determined by the operator which in turn may base it on previous experience. For example, it may be known that a received signal strength level below five causes errors leading to unacceptable signal reception. The computer 28 is able to detect when received signal strength levels consistently occur below the preset limit which thereby signifies poor performance and thus warranting action. By way of example, a consistently low signal strength level may cause an alarm to be initiated to alert the operator of performance problems with a particular BS. The operator can then immediately dispatch a technician for repairs which may include replacing aging components, for example.

The present invention contemplates a method of detecting base station performance degradation by transmitter interference and IM products that may be generated in the transceiver system and associated components. The method permits the prompt notification of poorly performing transceiver units due to interference from IM products. Thus one is able to determine if the origin of the performance degradation is due to intermodulation problems.

It should be understood that the embodiment shown herein is merely exemplary and that one skilled in the art can make variations and modifications to the process steps without departing from the spirit and scope of the invention. All such variations and modifications are intended to be included within the scope of the invention as defined by the appended claims.

What is claimed is:

1. A method of detecting degradation of a transceiver performance in a base station due to intermodulation products created in said base station, wherein said base station comprises a plurality of transceivers each of which includes a transmitter and a receiver and each of which operate at a designated frequency, said method comprising the steps of:

measuring, at said base station, a received signal strength for a first receiver frequency;

recording an operational state of said base station transmitters at the time of said received signal strength measurement;

correlating the recorded transmitter states with said received signal strength; and determining an affect on transceiver performance due to said intermodulation products created in said base station from said correlating step.

2. A method according to claim 1 wherein said step of measuring received signal strength is performed for a second receiver frequency.

3. A method according to claim 2 wherein said step of recording the state of all transmitters is performed for each receive signal strength measurement on said second receiver frequency.

4. A method according to claim 1 wherein a plurality of samples are taken that are comprised of data for received signal strength and state of transmitters.

5. A method according to claim 4 wherein the quantity of samples taken is one thousand.

6. A method according to claim 1 wherein said determining step further includes the step of notifying a system operator when the performance level is determined to below a predetermined value.

7. A method according to claim 6 wherein said predetermined value in said determining step is a five on a scale of zero to ten.

8. The method of claim 1, further comprising the step of:

inducing said intermodulation products in an antenna of said base station by operation of non-linear components disposed in said base station.

9. A method for monitoring operation of a base station comprising the steps of:

generating intermodulation products within said base station, which intermodulation products are routed back to an antenna of said base station;

determining an effect of said intermodulation products on a receive frequency at said base station by performing the steps of:

measuring a received signal strength on said receive frequency;

identifying an operational state of a plurality of base station transmitting units; and correlating said received signal strength with said operational states to determine said effect of said intermodulation products on said receive frequency.

10. The method of claim 9, further comprising the steps of:

measuring a received signal strength on a plurality of receive frequencies; and determining, for each receive frequency, whether that frequency is affected by a combination of operating base station transmitters.

11. The method of claim 9, further comprising the step of:

reporting said effect to a mobile switching center.

12. The method of claim 9, further comprising the step of:

notifying an operator if said effect exceeds a predetermined threshold.

* * * * *